United States Patent [19]

Chang et al.

[11] Patent Number: 4,485,228

[45] Date of Patent: Nov. 27, 1984

[54] THERMOSETTING HIGH SOLIDS SOLVENT-BASED POLYESTER-URETHANE TWO-COMPONENT COATING COMPOSITIONS

[75] Inventors: Wen-Hsuan Chang, Gibsonia; Ronald R. Ambrose, Allison Park; David T. McKeough, Gibsonia; Samuel Porter, Jr., Natrona Heights; Byron K. Johnston, Arnold, all of Pa.

[73] Assignee: PPG Industries, Inc., Pittsburgh, Pa.

[21] Appl. No.: 538,630

[22] Filed: Oct. 3, 1983

[51] Int. Cl.$^3$ .............................................. C08G 18/42
[52] U.S. Cl. .................................. 528/84; 428/423.1; 428/425.1; 428/425.6; 428/425.8
[58] Field of Search .............................................. 528/84

[56] References Cited

U.S. PATENT DOCUMENTS

| | | | |
|---|---|---|---|
| 2,871,218 | 1/1959 | Schollenberger | 260/45.4 |
| 2,953,539 | 9/1960 | Keplinger et al. | 260/31.6 |
| 3,012,987 | 12/1961 | Ansul | 260/45.4 |
| 3,015,650 | 1/1962 | Schollenberger | 260/75 |
| 3,094,510 | 6/1963 | Parker et al. | 260/75 |
| 3,326,861 | 6/1967 | Sandridge | 260/75 |
| 3,446,771 | 5/1969 | Matsubayashi et al. | 260/45.85 |
| 3,503,932 | 3/1970 | Reuter | 260/75 |
| 3,538,055 | 11/1970 | Camilleri et al. | 260/75 |
| 3,541,183 | 11/1970 | Kallert et al. | 260/858 |
| 3,664,979 | 5/1972 | Tanomura et al. | 260/75 NK |
| 3,804,810 | 4/1974 | Fryd | 260/75 NK |
| 3,838,105 | 9/1974 | Brachman | 260/75 NP |
| 3,862,093 | 1/1975 | Jellinek et al. | 260/75 EP |
| 3,882,189 | 5/1975 | Hudak | 260/850 |
| 3,900,446 | 8/1975 | McClung et al. | 260/75 NT |
| 3,912,790 | 10/1975 | Chang et al. | 260/849 |
| 3,959,201 | 5/1976 | Chang | 260/29.4 R |
| 3,962,522 | 6/1976 | Chang et al. | 428/423 |
| 4,111,913 | 9/1978 | Schuhmacher et al. | 528/273 |
| 4,165,345 | 8/1979 | Smith et al. | 525/419 |
| 4,169,196 | 9/1979 | Ehrlich et al. | 528/58 |
| 4,174,436 | 11/1979 | Korlatzki et al. | 528/80 |
| 4,248,996 | 2/1981 | Sterzel et al. | 528/272 |
| 4,387,194 | 6/1983 | Ottaviani et al. | 525/454 |
| 4,420,601 | 12/1983 | Kuroda et al. | 528/84 |

*Primary Examiner*—Herbert S. Cockeram
*Attorney, Agent, or Firm*—Godfried R. Akorli

[57] ABSTRACT

This invention encompasses a high solids, solvent-based, thermosetting two-component coating composition having the necessary flexibility, hardness and durability that make it an effective coating for both elastomeric and hard metal substrates. The composition comprises a polyester-urethane polyol and a curing agent comprising a polyisocyanate.

25 Claims, No Drawings

THERMOSETTING HIGH SOLIDS SOLVENT-BASED POLYESTER-URETHANE TWO-COMPONENT COATING COMPOSITIONS

BACKGROUND OF THE INVENTION

1. Field of the Invention:

The present invention relates to thermosetting, solvent-based resinous compositions. More specifically, the invention relates to solvent-based, high solids, two-component coatings comprising polyester-urethane polymers and polyisocyanates useful in coating both elastomeric and metal substrates.

2. Brief Description of the Prior Art:

There are known in the art coating compositions that can be applied to elastomeric substrates. These coating compositions are characterized by excellent flexibility, particularly at low temperatures. Illustrative of these coating compositions are those based on polyester-urethane polyols of relatively high molecular weight which are cured with aminoplasts. Another illustration of these coating compositions are those based on polymeric polyols such as soft polyurethane polyols cured with a stoichiometric excess of an aminoplast curing agent. Yet another illustration of these coating compositions are those comprising thermosetting resins, for example, hard polyester polyols, soft polyurethane polyols and aminoplast curing agents. It has been found that while these elastomeric coatings have a reasonable degree of hardness, they are not sufficiently hard to be used effectively on hard metal substrates.

Coating compositions that can be applied to hard metallic substrates are known in the art. These coating compositions are characterized by excellent hardness. An illustration therefor are coating compositions based on polyester polyols and acrylic polymers cured with aminoplasts or isocyanates. These metallic coatings, generally, are not flexible enough to be used effectively on elastomeric parts.

In this state of the art, an article with metallic and elastomeric parts, requires two types of coatings: one suitable for elastomeric parts and the other suitable for metallic parts. This requirement presents problems of color-matching of the different parts. Those skilled in the art would appreciate how difficult it is to prepare coating compositions having, conjointly, the properties of flexibility, durability and hardness. It would be all the more difficult to prepare high solids compositions having the conjoint properties. This invention provides a high solids coating composition, the cured coating of which has, conjointly, excellent properties of flexibility, durability and hardness which make it useful on both elastomeric and hard metal parts.

SUMMARY OF THE INVENTION

In accordance with the foregoing, the present invention encompasses a high solids, solvent-based, thermosetting, two-component coating composition having a sprayability of at least 40 percent, which when cured is flexible and hard in that when the coating composition is deposited on an elastomeric substrate and cured, the coated substrate can be bent around a ⅛-inch mandrel with the coating facing outwardly and the coating exhibits substantially no breaks or cracks when tested at 35° F., and in that when the coating composition is deposited on a metallic substrate and cured, the coated substrate has a Sward hardness of at least 14; said coating composition contains a film-former comprising a polyester-urethane polyol and a curing agent which is a polyisocyanate; the polyester-urethane polyol has a hydroxyl value of at least 50 and comprises (A) about 60 to 95 percent by weight acyclic moieties, and optionally (B) up to 30 percent by weight cyclic moieties; the sum of the weight percentage of cyclic moieties and the weight percentage of urethane moieties multiplied by 3 is from about 15 to 65. The weight percent is based on the total weight of the polyester-urethane polyol.

The coating compositions of this invention are of high solids type, that is, they are sprayable at high solids content. The sprayability is the maximum concentration of solids at which the coating composition can be atomized sufficiently to form a uniformly deposited coating, under normal spraying conditions of, say, temperature, pressure, and spray equipment design such as entails the use of an air suction spray gun operating at 60 psi with a No. 30 air cap. This maximum concentration is solvent dependent and usually occurs in a viscosity range of 15–19 seconds with a No. 4 Ford cup at room temperature after thinning with a solvent such as a mixture of methyl amyl ketone and 2-ethoxyethylacetate. Above this maximum concentration, appearance, leveling and solvent popping typically become unacceptable. With the high solids, the desired coating thickness and appearance is obtained without innumerable coating applications. Additionally, coating compositions of this type meet air pollution standards which require a reduction of organic solvent emissions of today's organic solvent-based coating compositions.

In this context, by the term "thermosetting" is meant that the coating composition, upon heating, will solidify or set to form a coating which will not remelt on further heating.

The elastomeric property of the coating can be determined by measuring the tensile strength, elongation, and flexibility of the cured coating, particularly at low temperature over an elastomeric substrate. The tensile strength and percent elongation of the coatings is determined according to ASTM D-639-72 for free films of the cured resinous ingredients.

The flexibility property of the coating can be determined by spray coating an elastomeric substrate and curing the coating at optimum conditions to give a dry film thickness of 1.5 to 2 mils. The elastomeric substrate is 1/16 to 3/16, typically ⅛-inch thick, thermoplastic polyurethane, such as commercially available from Mobay Company as TEXIN 355D. The coated substrate is bent around a ⅛-inch diameter mandrel with the coating side facing outward. After bending, the coating is examined for breaks and cracks. Testing can be conducted at standard temperatures such as room temperature, that is, 72°–77° F., or at lower temperatures. The lower temperatures can be obtained by cooling the substrate to standard temperatures of 45° F., 35° F., or 0° F. before bending. The lower the temperature, the more stringent the test. Preferably, the coating can withstand bending at 20° F., more preferably 0° F. The flexibility property of the coating is considered as good when there is no break in the coating or substantially no break, i.e., when the occurring break is not completely across the width of the substrate which is about 1 to 3 inches, at the measured temperature.

The hardness property of the coating composition can be determined by the Sward method using a Sward Rocker as described in ORGANIC COATING TECHNOLOGY, Payne, Vol. 1, 1965, pages 642–643. Testing is done on an optimally cured coating having a dry film thickness of 1½ to 2 mils over 20 gauge steel panels.

The hydroxyl value of the polyester-urethane polyol of the coating compositions is determined according to ASTM-E-222-76, Method B (reflux one hour). In the context of the foregoing, the invention is more fully described hereinbelow.

DETAILED DESCRIPTION OF THE INVENTION

The coating compositions of the present invention are of two-component, high solids type, and have, conjointly, the properties of hardness and flexibility. Preferably, for automotive topcoat usage, the coating composition will be formulated to be weather durable. More specifically, the coating compositions have a sprayability of at least 40 percent, and are capable of producing cured coatings having a flexibility to withstand ½-inch mandrel bend at 35° F. (2° C.) and a Sward hardness of at least 14. Weather-durability can be predicted in certain instances by accelerated tests.

The sprayability of the coating composition is preferably about 45 percent and more preferably about 55 percent by weight.

The flexibility and hardness properties are imparted to the coating composition by the acyclic and cyclic content as well as the urethane content of the polyester-urethane polyols present therein. By cyclic content is meant the weight percent of the ring component of the polyester-urethane polyol, e.g.,

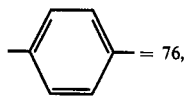 = 76, based on its total weight. By urethane content is meant the weight percent of the component which is of the structure:

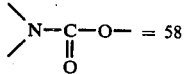 = 58 in the polyester-urethane polyol based on its total weight. By acyclic content is meant the weight percent of the component other than the aforedescribed cyclic and urethane moieties of the polyester-urethane polyol.

To impart the required flexibility, the reactants are selected on the basis that they provide acyclic moieties in the reaction product in an amount sufficient to provide a cured coating with a flexibility to withstand at least ½-inch mandrel bend at 35° F., preferably at 0° F. and more preferably at −20° F. Accordingly, the polyester-urethane polyol typically contains from about 60 to 95, and preferably from about 75 to 85 percent acyclic moieties.

To impart the required hardness, the reactants are selected on the basis that they provide urethane moieties and/or cyclic moieties in the resultant polyester-urethane polyols in an amount sufficient to provide cured coatings with a Sward hardness of at least 14, preferably 22, and more preferably 40. Accordingly, the polyester-urethane polyol typically contains up to about 30, and preferably from about 10 to 25 percent cyclic moieties.

In providing the required hardness, the amounts of the cyclic moieties and the urethane moieties can be adjusted. Accordingly, the cyclic moieties and the urethane moieties are in the following relationship. On a formula weight basis, the sum of the cyclic moieties and three times the sum of the urethane moieties in the polyester-urethane polyol is in the range of 15 to 65 and preferably from 35 to 55. Accordingly, the polyester-urethane polyol contains from about 1 to 20 percent and preferably 5 to 10 percent by weight urethane moieties.

Preferably, the coating compositions of the invention will be durable to weathering. This property is usually evaluated by outdoor exposure in Florida. Preferably, coating compositions of the invention, when properly evaluated, will be able to withstand one-year exposure in Florida while maintaining at least 30 percent of their initial gloss.

In preparing the polyester-urethane polyol, an organic polyisocyanate is reacted with a polyester-polyol which is formed from the reaction of an organic polycarboxylic acid and a polyol.

The organic polyisocyanate useful herein can be an aliphatic or an aromatic polyisocyanate or a mixture thereof. Aliphatic polyisocyanates (including cycloaliphatic polyisocyanates) are preferred because of better durability in the resultant coating. Diisocyanates are preferred, although higher functional polyisocyanates such as triisocyanates can be used, preferably in admixture with the diisocyanates. However, their use does result in some chain branching which results in increased viscosity and difficulties in formulating the high solids coatings of the invention. Non-limiting examples of suitable diisocyanates are 4,4'-diphenylmethane diisocyanate, 1,4-tetramethylene diisocyanate, isophorone diisocyanate, trimethylhexamethylene diisocyanate, tetramethylxylene diisocyanate, 1,6-hexamethylene diisocyanate, isocyanurate from isophorone isocyanate, available from Veba Company as T1890, the biuret from 1,6-hexamethylene diisocyanate, available from Mobay Chemical Company as DESMODUR N, and 4,4'-methylene-bis-(cyclohexyl isocyanate). Examples of suitable higher functionality polyisocyanates are polymethylene polyphenyl isocyanates. The reaction of the isocyanates, it is noted, provides the urethane moieties which impart hardness. It is also noted that to the extent that the isocyanates contain cyclic and acyclic groups, they will contribute, respectively, to hardness and flexibility of the coating.

The polyester-polyol is prepared preferably by reacting an organic polycarboxylic acid or a functional equivalent thereof such as an anhydride or a lower alkyl ester, with an organic polyol. The organic polycarboxylic acid preferably contains cyclic moieties. Diacids are preferred, although higher functional polyacids can be used, preferably in admixture with the diacids. Non-limiting examples of the cyclic polycarboxylic acids or their functional equivalents are o-phthalic acid, isophthalic acid, terephthalic acid, o-hexahydrophthalic acid, m-hexahydrophthalic acid, p-hexahydrophthalic acid, tetrahydrophthalic acid or a hydrocarbyl-substituted hexahydrophthalic acid wherein the hydrocarbyl group can be an alkyl, alkenyl or aryl group. Of these acids, the aliphatic one such as hexahydrophthalic acid or its anhydride is preferred.

Besides the cyclic polycarboxylic acids or their functional equivalents, acyclic polycarboxylic acids containing from at least 2, preferably about 2 to 20 carbon atoms may also be employed. Examples thereof include succinic acid, glutaric acid, adipic acid, suberic acid and sebacic acid. Further, mixtures of cyclic polycarboxylic acid with acyclic carboxylic acid can be employed.

The polyols employed in the preparation of the polyester can be cyclic or acyclic and preferably are aliphatic polyols. Diols are preferred, although higher functional polyols such as triols can be used, preferably in admixture with the diols. Examples of the cyclic polyols are bisphenol A, hydrogenated bisphenol A, cyclohexanediol and cyclohexanedimethanol. Examples of the acyclic polyols are those containing, preferably, from about 2 to 18 carbon atoms. Non-limiting examples of the acyclic polyols are 2,2,4-trimethyl-1,3-pentanediol, 1,4-butanediol, neopentyl glycol, and 1,6-hexanediol. Mixtures of the polyols, for example, cyclic and acyclic polyols, can be employed. Preferably, the polyol contains neopentyl group branching such as derived from neopentyl glycol and 2,2-dimethyl-3-hydroxypropyl-2,2-dimethyl-3-hydroxypropionate. Typically, the polyester will contain from about 10 to 60, more preferably from about 15 to 40 percent by weight of the alcohol branched neopentyl groups. The percentage by weight is based on the weight of the polyol which contains the neopentyl branching divided by the total weight of the polyol ingredients which are used in preparing polyester polyols. While the use of diols is preferred herein, higher functionality polyols such as triols can be used, preferably in admixture with the diols. An example of the higher functional polyol is trimethylolpropane.

The reaction of the acid with the polyol is an esterification reaction which is well known in the art. In accordance with this invention, the resultant polyester is hydroxyl-functional. It is of a low molecular weight, preferably with a hydroxyl value of about 150 to 350. Preferably, the polyesters will contain some residual acid groups. Typically, the polyester will have an acid value of up to 15.

Polyester polyols prepared by other methods and/or with other ingredients can also be used in this invention. For example, polyester polyols from lactones can be prepared by subjecting a lactone to polymerization in the presence of a low molecular weight polyol such as ethylene glycol, diethylene glycol, triethylene glycol, 1,4-butanediol, propylene glycol and cyclohexane dimethanol. This and other methods of preparing polyester polyols in accordance with this invention are hereby encompassed.

The organic polyisocyanate is reacted with the polyester polyol to produce a polyester-urethane polyol having a hydroxyl value of at least 50. Preferably, the hydroxyl value is within the range of about 140 to 250.

It is desired to point out that the isocyanates, the acids and polyols described hereinabove can have substituents provided that the substituents do not adversely affect the reaction or utility of the resultant composition. The substituent can be a thio group, a halogen group, or the like.

The polyester-urethane polyol described above preferably has a calculated number average molecular weight of from about 300 to 2000.

Hydroxyl values lower than 50 are generally less preferred because of higher resin viscosities and the difficulties associated in formulating high solids coating compositions. Hydroxyl values much higher than 250 are generally less preferred because of insufficient flexibility in the resultant coating.

In the practice of the invention, the polyester-urethane polyol is employed in combination with a curing agent which is capable of reacting with the active hydrogens in the polyester-urethane polyol to give a thermosetting coating. Examples of curing agents are polyisocyanate curing agents.

Specific examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful isocyanates are the isocyanurate from isophorone isocyanate commercially available from Veba Company as T1890 and the biuret from 1,6-hexamethylene diisocyanate commercially available from Mobay Chemical as DESMODUR N and KL5-2444, a triisocyanurate available from Mobay Chemical.

The polyester-urethane polyol and isocyanate curing agent are mixed just prior to their application.

The amounts of polyester-urethane polyol and curing agent which are used in the practice of the invention are preferably adjusted so that the ratio of polyester-urethane polyol:curing agent is within the range of 0.8 to 1.3:1, preferably 1.1:1 of the —NCO to —OH groups. Ratios of polyester—urethane polyol:curing agent greater than aforestated are not preferred because hardness and durability of the resultant coating will suffer; whereas ratios lower than aforestated are not preferred because flexibility of the resultant coating will suffer.

The above-described resinous components can be formulated into clear coating compositions or, alternately, they can be formulated with pigments to form paints. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain pigment, the pigment-to-resin weight ratios may be as high as 2:1 and for most pigmented coatings, are within the range of 0.05 to 1:1.

Although the coating compositions of the present invention are of the high solids type, a liquid diluent is usually present in the composition. By liquid diluent is meant a solvent or non-solvent which is volatile and is removed after the coating is applied and is needed to reduce viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone. The diluent is present in amounts up to 60 percent by weight, usually 35 to 55 percent by weight, based on total weight of diluent and resin solids.

In addition to the above ingredients, various fillers, plasticizers, anti-oxidants, U.V. light absorbers, flow control agents, surfactants and other formulating additives can be employed if desired. These materials are optional and generally constitute up to about 10 percent by weight, based on total solids in the coating formulation.

For coating compositions, the use of polymeric microparticles such as described in U.S. Pat. No. 4,147,688 is preferred for sag control and metallic pigment pattern control. The polymeric microparticles help to align metallic pigments such that they give the coating a lustrous appearance.

The coating compositions of the present invention are designed for application by spraying, although other conventional methods of coating including brushing, dipping and flow coating can be employed if desired. However, as mentioned above, they are especially formulated for spraying. Usual spray techniques and equipment are utilized. Coatings of the present invention can be applied virtually over any substrate including wood, metal, glass, cloth, plastics, foams and the like, as well as over various primers. The coatings are particularly useful on resilient and rubbery substrates, elastomeric parts, plastics, and on metal surfaces such as steel and aluminum. In accordance with this invention, the same coating composition can be used to coat an article having elastomeric and metallic parts. Hence, automobiles, for example, can be assembled and painted with the same coating in accordance with this invention. Since the same coating is employed, it is relatively easier to obtain color matching.

The combination of outstanding properties of the coating compositions of the present invention makes them useful for a wide variety of applications. They can be used for coating automotive parts such as automobile bodies and truck cabs. Also, they can be used for other coating applications such as coatings for appliance parts such as refrigerators and washing machines, and they can also be used for coil coating applications.

In general, coating thickness will vary depending upon the application desired. In general, coatings from about 0.5 to 3 mils have been found to be useful in most applications.

After application to the substrate, the coatings are cured. Curing is usually conducted at temperatures of about 100° C. to 200° C., and in most cases, a cure schedule is from about 20 to 30 minutes. Higher or lower temperatures (such as room temperature) with correspondingly shorter or longer times can be utilized, although the exact cure schedule best employed depends upon the nature of the substrate as well as the particular components used in formulating the coating compositions. Catalysts such as dibutyltin dilaurate, dibutyltin oxide, amines and the like are employed as they usually permit use of lower temperatures and shorter times for cure.

It is noteworthy that the two-component compositions exhibit substantially improved properties of flexibility, hardness and durability. In certain embodiments, the cured coatings have a Sward hardness of 60 and flexibility to withstand ½-inch mandrel bend at −20° F.

The coating compositions of the present invention can be applied to the substrate in a clear-over-color application in which a pigmented or colored base coat is first applied to a substrate, followed by application of a clear top coat.

The following examples illustrate the invention. All quantities are on a weight basis unless otherwise indicated.

EXAMPLE 1

Part 1

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 7165.2 |
| 1,6-Hexanediol | 5493 |
| Neopentyl glycol | 4841.6 |

The above ingredients were charged to a properly equipped reaction vessel and the resultant mixture heated to react in a nitrogen atmosphere. At 170° C. (338° F.), there resulted the production of water of (esterification) reaction. With the continuous removal of the water, heating was continued to 200° C. (392° F.). The reaction mixture was then held at 200° C. (392° F.) for about 9 hours until an acid value of about 9.5 was attained. The resultant mixture was then cooled to a temperature of about 70° C. (158° F.), discharged and analyzed.

Analysis: Theoretical solids content was 100 percent, viscosity was 95.6 stokes, acid value was 9.5 and hydroxyl value was 319.5.

Part 2

A polyester-urethane polyol was prepared with the above polyester-polyol composition, as follows:

| Ingredients | Parts by Weight (grams) |
| --- | --- |
| The polyester-polyol (as described above) | 8100 |
| Trimethyl hexamethylene diisocyanate | 1429 |
| Dibutyltin dilaurate | 0.95 |
| Methylisobutyl ketone | 1058 |

The above ingredients were charged to a properly equipped reaction vessel and the resultant mixture heated to react in a nitrogen atmosphere to a temperature of 110° C. (230° F.). The reaction mixture was held at this temperature for about 2½ hours until all the isocyanate had reacted. The resultant composition was discharged and analyzed.

Analysis: Theoretical solids content was 90 percent, acid value was 7.9 and hydroxyl value was 180.2.

Part 3

A high solids, thermosetting composition was prepared with the above polyester-urethane polyol, as follows. The polyester-urethane polyol was formulated with a polyisocyanate curing agent and other ingredients listed below.

| Ingredients | Resin Solids | Parts by Weight (grams) |
| --- | --- | --- |
| Component 1 | | |
| The polyester-urethane composition | 46.8 | 52.0 |
| Cellulose acetate butyrate | 2.0 | 8 |
| U.V. absorber[1] | 2.0 | 2.0 |
| U.V. stabilizer[2] | 1.0 | 1.0 |
| Dibutyltin dilaurate | 0.2 | 2.0 |
| Pigment paste[3] | 10.9 | 78.7 |
| Component 2 | | |

| Ingredients | Resin Solids | Parts by Weight (grams) |
|---|---|---|
| Polyisocyanate (curing agent)[4] | 40.3 | 44.8 |
| Methyl amyl ketone | | 27.4 |

[1] Available from Ciba-Geigy Company as TINUVIN.
[2] Available from Ciba-Geigy Company as TINUVIN.
[3] The pigment paste comprised titanium dioxide (50 grams pigment solids) dispersed with a vehicle comprising a polyurethane resin to a Hegman scale of 7.
[4] A triisocyanurate available as KL5-2444 from Mobay Chemical.

The coating composition had a pot life of 4 hours, solids content of 60 percent by weight. This coating composition was sprayed on a ⅛-inch thick thermoplastic polyurethane commercially available from Mobay as TEXIN 355D and as a clear coat on a metal substrate. The obtained films were baked at 200° F. (93° C.) for 30 minutes and then subjected to hardness and flexibility tests with the following results: The coated substrates exhibited Sward hardness of 60, and withstood a ½-inch mandrel test at −20° F. without a substantial break.

EXAMPLE 2

This example illustrates the high solids compositions comprising a polyester-urethane polyol, and the method of preparing same. First, a polyester-polyol composition was prepared, as follows:

| Ingredients | Parts by Weight (grams) |
|---|---|
| Isophthalic acid | 1497.4 |
| 1,6-Hexanediol | 1064.4 |
| Neopentyl glycol | 938.1 |
| Butyl stannoic acid | 0.35 |

The method of preparation was essentially the same as described in Example 1, part 1.

Analysis of the resultant composition was as follows: Theoretical solids content was 100 percent, viscosity (stokes) was 450, acid value was 6.3 and hydroxyl value was 308.8.

A polyester-urethane polyol was prepared with the above polyester-polyol composition, as follows:

| Ingredients | Parts by Weight (grams) |
|---|---|
| The polyester-polyol (as described above) | 8100 |
| Trimethyl hexamethylene diisocyanate | 1429 |
| Dibutyltin dilaurate | 0.95 |
| Methylisobutyl ketone | 1058 |

The method of preparation was essentially the same as described in Example 1, part 2.

Analysis of the resultant composition was as follows: Theoretical solids content was 90 percent, viscosity (stokes) was 300, acid value was 4.9 and hydroxyl value was 165.6.

EXAMPLE 3

This example illustrates the high solids compositions comprising a polyester-urethane polyol, and the method of preparing same. First, a polyester-polyol composition was prepared, as follows:

| Ingredients | Parts by Weight (grams) |
|---|---|
| Hexahydrophthalic anhydride | 5465.5 |
| 1,6-Hexanediol | 4190 |
| Neopentyl glycol | 3693 |

The method of preparation was essentially the same as described in Example 1, part 1.

Analysis of the resultant composition was as follows: Theoretical solids content was 100 percent, viscosity (stokes) was 95.1, acid value was 9.9 and hydroxyl value was 308.7.

A polyester-urethane polyol was prepared with the above polyester-polyol composition, as follows:

| Ingredients | Parts by Weight (grams) |
|---|---|
| The polyester-polyol (as described above) | 8100 |
| DESMODUR N-100[1] | 1429 |
| Dibutyltin dilaurate | 0.95 |

[1] Acyclic triisocyanate, available from Mobay Chemicals.

The method of preparation was essentially the same as described in Example 1, part 2.

Analysis of the resultant composition was as follows: Theoretical solids content was 90 percent, acid value was 6.8 and hydroxyl value was 152.4.

EXAMPLE 4

This example illustrates the high solids compositions comprising a polyester-urethane polyol, and the method of preparing same. First, a polyester-polyol composition was prepared, as follows:

| Ingredients | Parts by Weight (grams) |
|---|---|
| Hexahydrophthalic anhydride | 1151.70 |
| 1,6-Hexanediol | 1103.09 |
| Neopentyl glycol | 972.22 |
| Adipic acid | 272.96 |
| Butyl stannoic acid (catalyst) | 0.35 |

The method of preparation was essentially the same as described in Example 1, part 1.

Analysis of the resultant composition was as follows: Theoretical solids content was 90 percent, viscosity (stokes) was 4.39, acid value was 5.8 and hydroxyl value was 288.4.

A polyester-urethane polyol was prepared with the above polyester-polyol composition, as follows:

| Ingredients | Parts by Weight (grams) |
|---|---|
| The polyester-polyol (as described above) | 950 |
| Trimethyl hexamethylene diisocyanate | 150 |
| Dibutyltin dilaurate | 0.1 |

The method of preparation was essentially the same as described in Example 1, part 2.

Analysis of the resultant composition was as follows: Theoretical solids content was 90 percent, viscosity (stokes) was 50, acid value was 4.9 and hydroxyl value was 180.4.

EXAMPLE 5

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1132.4 |
| 1,6-Hexanediol | 867.6 |
| ESTER DIOL 204[1] | 1500.0 |

[1] 2,2-Dimethyl-3-hydroxypropyl-2,2-dimethyl-3-hydroxypropionate available from Union Carbide Corporation.

The method of preparation was essentially the same as described in Example 1, part 1.

Analysis of the resultant composition was as follows: Theoretical solids content was 100 percent, viscosity (stokes) was 83.5, acid value was 10.9 and hydroxyl value was 233.6.

A polyester-urethane polyol was prepared with the above polyester-polyol composition, as follows:

| Ingredients | Parts by Weight (grams) |
| --- | --- |
| The polyester-polyol (as described above) | 850 |
| Trimethyl hexamethylene diisocyanate | 150 |
| Dibutyltin dilaurate | 0.1 |
| Methylisobutyl ketone (90% solids) | 111 |

The method of preparation was essentially the same as described in Example 1, part 2.

Analysis of the resultant composition was as follows: Theoretical solids content was 90 percent, viscosity (stokes) was 103.8, acid value was 8.13 and hydroxyl value was 105.53.

EXAMPLE 6

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1143 |
| 1,6-Hexanediol | 1314 |
| Neopentyl glycol | 772 |
| Adipic acid | 271 |
| Butyl stannoic acid | 0.35 |

The method of preparation was essentially the same as described in Example 1, part 1.

Analysis of the resultant composition was as follows: Theoretical solids content was 100 percent, viscosity (stokes) was 23.8, acid value was 7.75 and hydroxyl value was 312.15.

A polyester-urethane polyol was prepared with the above polyester-polyol composition, as follows:

| Ingredients | Parts by Weight (grams) |
| --- | --- |
| The polyester-polyol (as described above) | 850 |
| Trimethyl hexamethylene diisocyanate | 150 |
| Dibutyltin dilaurate | 0.1 |
| Methylisobutyl ketone | 111 |

The method of preparation was essentially the same as described in Example 1, part 2.

Analysis of the resultant composition was a follows: Theoretical solids content was 90 percent, viscosity (stokes) was 34.6, acid value was 7.5 and hydroxyl value was 164.0.

EXAMPLE 7

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1625.4 |
| 1,6-Hexanediol | 996.4 |
| Neopentyl glycol | 878.2 |

The method of preparation was essentially the same as described in Example 1, part 1.

Analysis of the resultant composition was as follows: Theoretical solids content was 100 percent, viscosity (stokes) was 364.0, acid value was 11.6 and hydroxyl value was 208.4.

A polyester-urethane polyol was prepared with the above polyester-polyol composition, as follows:

| Ingredients | Parts by Weight (grams) |
| --- | --- |
| The polyester-polyol (as described above) | 900 |
| Trimethyl hexamethylene diisocyanate | 100 |
| Dibutyltin dilaurate | 0.1 |
| Methylisobutyl ketone | 250 |

The method of preparation was essentially the same as described in Example 1, part 2.

Analysis of the resultant composition was as follows: Theoretical solids content was 100 percent, viscosity (stokes) was 8.27, acid value was 8.5 and hydroxyl value was 108.7.

EXAMPLE 8

This example illustrates the high solids compositions comprising a polyester-urethane polyol, and the method of preparing same. First, a polyester-polyol composition was prepared, as follows:

| Ingredients | Parts by Weight (grams) |
| --- | --- |
| Hexahydrophthalic anhydride | 1118.25 |
| 1,6-Hexanediol | 1071.05 |
| Neopentyl glycol | 943.98 |
| Sebacic acid | 366.70 |
| Butyl stannoic acid | 0.35 |

The method of preparation was essentially the same as described in Example 1, part 1.

Analysis of the resultant composition was as follows: Theoretical solids content was 100 percent, viscosity (stokes) was 29.96, acid value was 8.09 and hydroxyl value was 302.59.

A polyester-urethane polyol was prepared with the above polyester-polyol composition, as follows:

| Ingredients | Parts by Weight (grams) |
| --- | --- |
| The polyester-polyol (as described above) | 425 |
| Trimethyl hexamethylene diisocyanate | 75 |
| Dibutyltin dilaurate | 0.060 |
| Methylisobutyl ketone | 56 |

The method of preparation was essentially the same as described in Example 1, part 2.

Analysis of the resultant composition was as follows: Theoretical solids content was 90 percent, viscosity (stokes) was 31.50, acid value was 6.2 and hydroxyl value was 167.8.

EXAMPLE 9

A clear coating composition was prepared in essentially the same manner as described in Example 1. The following were used in the preparation.

| Ingredients | Resin Solids | Parts by Weight (grams) |
|---|---|---|
| Component 1 | | |
| The polyester-urethane, as described in Example 1, Part 2 | 57.6 | 64.0 |
| U.V. absorber[1] | 2.0 | 2.0 |
| U.V. stabilizer[2] | 0.5 | 2.0 |
| Cellulose acetate butyrate | 2.0 | 8.0 |
| Dibutyltin dilaurate | 0.7 | 2.0 |
| Methyl amyl ketone | | 15.4 |
| Component 2 | | |
| Polyisocyanate (curing agent)[3] | 40.4 | 44.9 |
| Methyl amyl ketone | | 48.5 |

[1] Available from Ciba-Geigy Company as TINUVIN.
[2] Available from Ciba-Geigy Company as TINUVIN.
[3] A triisocyanurate, available as KL5-2444 from Mobay Chemical.

The coating composition had a pot life of 4 hours and a sprayable solids content of 60 percent by weight. This coating composition was sprayed on a ⅛-inch thick thermoplastic polyurethane commercially available from Mobay as TEXIN 355D and as a clear coat on a metal substrate. The obtained films were baked at 250° F. (121° C.) for 30 minutes and then subjected to hardness and flexibility tests with the following results: The coated substrates exhibited Sward hardness of 30 and withstood a ½-inch mandrel test at 0° F. without a substantial break. Free film elongation was 160 percent and tensile strength was 4956 psi.

We claim:

1. A high solids, solvent-based, thermosetting, two-component coating composition having a sprayability of at least 40 percent, which when cured is flexible and hard in that when the coating composition is deposited on an elastomeric substrate and cured, the coated substrate can be bent around a ½-inch mandrel with the coating facing outwardly and the coating exhibits substantially no breaks or cracks when tested at 35° F.; and in that when the coating composition is deposited on a metallic substrate and cured, the coated substrate has a Sward hardness of at least 14; wherein said coating composition contains as a first component a film-former comprising a polyester-urethane polyol and as a second component a polyisocyanate curing agent; and wherein the polyester-urethane polyol has a hydroxyl value of at least 50 and comprises:

(A) about 60 to 95 percent by weight acyclic moieties, and optionally (B) up to 30 percent by weight cyclic moieties;

the sum of the weight percentage of cyclic moieties and the weight percentage of urethane moieties multiplied by 3 is from about 15 to 65; the equivalent ratio of the polyester-urethane polyol to the polyisocyanate curing agent is 0.8 to 1.3:1.

2. A composition of claim 1, wherein the polyester-urethane polyol has a hydroxyl value of 140 to 250.

3. A composition of claim 1, wherein the polyester-urethane polyol contains from about 10 to 25 percent cyclic moieties.

4. A composition of claim 1, wherein the polyester-urethane polyol contains from about 1 to 20 percent urethane moieties.

5. A composition of claim 1, wherein the polyester-urethane polyol contains from about 5 to 10 percent urethane moieties.

6. A composition of claim 1, wherein the curing agent is a polyisocyanate.

7. A composition of claim 1, wherein the polyester-urethane polyol is prepared by reacting an organic polyisocyanate with a polyester polyol formed from reacting an organic polycarboxylic acid with a polyol.

8. A composition of claim 7, wherein the organic polycarboxylic acid is a dicarboxylic acid or a derivative thereof and the polyol is a diol.

9. A composition of claim 8, wherein the organic dicarboxylic acid contains cyclic groups.

10. The composition of claim 9, wherein the organic dicarboxylic acid is selected from the class consisting of o-phthalic, isophthalic, terephthalic, o-hexahydrophthalic, p-hexahydrophthalic, iso-hexahydrophthalic, tetrahydrophthalic or hydrocarbyl-substituted hexahydrophthalic acid or a derivative thereof, wherein the hydrocarbyl group is an alkyl, alkaryl or aryl group.

11. A composition of claim 10, wherein the organic dicarboxylic acid is aliphatic and is selected from the group consisting of hexahydrophthalic acid and methyl hexahydrophthalic acid.

12. A composition of claim 8, wherein the diol is aliphatic.

13. The composition of claim 12, wherein the aliphatic diol is a mixture of a straight chain diol containing from 2 to 20 carbon atoms and a diol containing neopentyl group branching.

14. A composition of claim 7, wherein the polyisocyanate is aliphatic.

15. The composition of claim 14, wherein the polyisocyanate is a diisocyanate.

16. A composition of claim 15, wherein the diisocyanate is trimethylhexamethylene diisocyanate.

17. The composition of claim 1 which contains from 10 to 60 percent by weight neopentyl group branching.

18. A composition of claim 7 in which the equivalent ratio of polyol to polycarboxylic acid is about 2:1 and the equivalent ratio of polyisocyanate to polyester polyol is about 1:3–4.

19. A composition of claim 1 wherein the equivalent ratio of the polyester-urethane polyol to the polyisocyanate curing agent is 1.1:1, based on —NCO to —OH groups.

20. A high solids, solvent-based, thermosetting, two-component coating composition having a sprayability of at least 40 percent, which when cured is weather-durable, flexible and hard in that when the coating composition is deposited on an elastomeric substrate and cured, the coated substrate can be bent around a ½-inch mandrel with the coating facing outwardly and the coating exhibits substantially no breaks or cracks when tested at 20° F.; and in that when the coating composition is deposited on a metallic substrate and cured, the coated substrate has a Sward hardness of at least 14; wherein said coating composition contains a film-former comprising as a first component a polyester-urethane polyol and as a second component a polyisocyanate curing agent; wherein the polyester-urethane polyol has a hydroxyl value of at least 50 and is prepared by reacting:
(1) an aliphatic diisocyanate containing alkyl branching with
(2) a polyester polyol formed from reacting:
  (a) hexahydrophthalic acid or alkyl-substituted hexahydrophthalic acid with
  (b) a mixed diol comprising:
    (i) a straight chain aliphatic diol containing from 2 to 20 carbon atoms,
    (ii) an aliphatic diol containing neopentyl group branching;
said polyester-urethane polyol containing 70 to 95 percent by weight acyclic moieties and the sum of the weight percentage of cyclic moieties and the weight percentage of urethane moieties multiplied by 3 is from 15 to 65; the equivalent ratio of the polyester-urethane polyol to the polyisocyanate curing agent is 0.8 to 1.3:1.

21. A composition of claim 20, wherein the diisocyanate is trimethylhexamethylene diisocyanate.

22. A composition of claim 20, wherein the acid is hexahydrophthalic.

23. A composition of claim 20, wherein the diol containing the neopentyl groups is neopentyl glycol.

24. A composition of claim 20, wherein the straight chain diol is 1,6-hexanediol.

25. A composition of claim 20, wherein the equivalent ratio of diol to diacid is about 2:1 and the equivalent ratio of the diisocyanate to the polyester polyol is about 1:3-4.

* * * * *